Oct. 17, 1961  E. H. LESLIE  3,004,665
SYSTEM FOR BENEFICIATING GRAVEL AND THE LIKE
Filed Aug. 24, 1955  2 Sheets-Sheet 1

INVENTOR
Eugene H. Leslie

Oct. 17, 1961 E. H. LESLIE 3,004,665
SYSTEM FOR BENEFICIATING GRAVEL AND THE LIKE
Filed Aug. 24, 1955 2 Sheets-Sheet 2

INVENTOR
Eugene H. Leslie

United States Patent Office 3,004,665
Patented Oct. 17, 1961

3,004,665
SYSTEM FOR BENEFICIATING GRAVEL
AND THE LIKE
Eugene H. Leslie, 1831 Traver Road, Ann Arbor, Mich.
Filed Aug. 24, 1955, Ser. No. 530,354
4 Claims. (Cl. 209—119)

My invention relates to a system for beneficiating gravel and the like and particularly to the continuous processing of loose aggregates of mineral particles containing components which differ from one another in size, shape, strength, density, mineral components and structure, hardness, elasticity, porosity, water-absorption, and other properties, so as to remove certain undesired classes of particles and to yield a product richer in certain other desired classes of particles which classes in particular, differ mainly in elastic moduli, strength, hardness, porosity, water-absorption, and mineral components and structure.

One problem to which my invention provides a new and very effective solution is the beneficiation of washed and sized natural gravel for use as coarse aggregate in concrete, with respect to its content of materials known to be deleterious to concrete. Rock particles in such gravel may be qualitatively classified as "hard" stone, "soft" stone, chert, "hard absorbent" stone, encrusted stones and thin elongated stone, of which only hard stone is desirable in concrete. Hard stones are those other than chert which are not scratched by a file and are of low porosity. Soft stones vary from crumbly materials to pebbles which are appreciably scratched by a file. Thin elongated stones are sufficiently described by the name alone. Encrusted stones are pebbles having patches of small particles cemented to the surfaces, sometimes covering a substantial portion of the surface area of such encrusted pebbles. Hard absorbent stones are those which are scratched only slightly by a file, if at all, but which are porous and absorb water to an extent to cause deterioration by freezing and thawing. The cherts are highly siliceous rocks, some of the lighter and more porous of which may be deleterious. Also cherts from some areas are of such chemical composition as to react with Portland cement causing weakness in the concrete; these, too, are deleterious.

Natural gravel often contains one or more of these deleterious components greatly in excess of the amounts permitted by specifications for coarse aggregate for concrete and there has long been a great interest in and need for a simple, cheap and effective system for improving the quality of gravel by reducing to a small amount the content of these deleterious materials in the product. The system of my invention is useful for effecting any practical enrichment of hard stone with respect to soft stone as well as substantial enrichment of hard stone with respect to thin elongated stones, encrusted stones and hard absorbent stone. In addition there seems to be slight beneficiation of the product with respect to chert content, although I do not regard the present invention as an adequate solution of the chert removal problem. In the following discussion, emphasis is placed on beneficiation of the product with respect to hard and soft stone components and the examples given do not refer to the accompanying important beneficiation with respect to thin elongated stones, encrusted stones, hard absorbent stone or to the incidental improvement with respect to chert.

Various systems have been proposed for the beneficiation of such mineral aggregates and some of them, which operate on the principle of separation by difference in density of the minerals, have had a fair measure of commercial acceptance. Such systems are inherently incapable of avoiding inclusion of a substantial portion of soft stones with the sound stone product, and, also including a substantial portion of sound stone in the soft stone rejects which cannot be overcome due to the overlap in density between the desired and undesired components. Such systems are likewise unable to make any shape discrimination or to separate particles which have a high degree of water absorbency from other desirable heavy materials. The systems require, furthermore, a very substantial capital investment and involve a substantial operating cost per ton of material treated.

It has also been suggested that mineral aggregates may be separated into products predominating in harder and softer components by applying the principle of difference in resilient rebound from an elastic body, as proposed, for example, in Pearse Patent 873,326 granted December 10, 1907 and Stevens Patent 2,260,095 granted October 21, 1941. None of these suggestions have, however, found commercial acceptance in the field of gravel preparation according to my information and belief after extensive investigation of this art. The invention disclosed in these specifications employs the principle of elastic resilient rebound on impact for beneficiation of mineral aggregates, utilizing certain discoveries of mine many of which are also disclosed in my co-pending application Ser. No. 530,331 filed August 24, 1955; but the present invention relates particularly to a method and apparatus involving multiple stage treatment, recovering the beneficiated product from each stage, not claimed in the said co-pending application and further disclosed herein. Multiple stage treatment has been suggested in the Stevens patent referred to above, and is not claimed here to be per se new; however, it is relatively ineffective in systems such as disclosed by Stevens as compared to the system disclosed herein, which effects remarkable improvements in the beneficiation achieved and results in a commercially useful system.

By means of the present invention, not only can I substantially exhaust a given aggregate supply of its hard stone which is recovered in a beneficiated product containing soft stone within the most rigid of current specifications for concrete aggregates, but I can obtain a substantial recovery of product absolutely free of soft stone heretofore not believed to be possible except by laborious hand picking.

I will now describe my invention with reference to the annexed drawings, in which FIGURE 1 is a schematic diagram of a simplified form of the apparatus typical of each stage of my multi-stage system;

Figure 1:
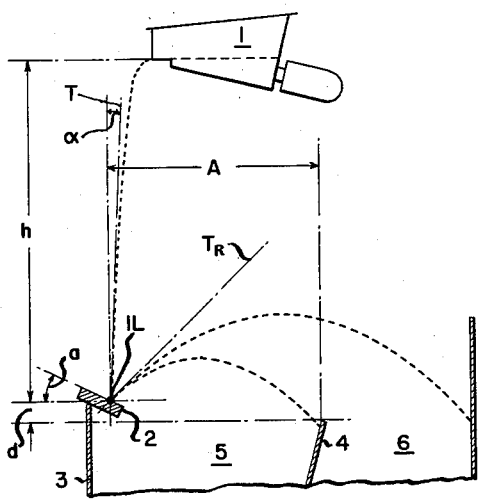

Each stage of the system of this invention includes the several elements shown diagrammatically in FIGURE 1. These comprise an aggregates feeder 1, an inclined impact plate 2 disposed below the feeder in the path of the discharged pebbles at a distance below the feeder indicated by the letter $h$, a hopper 3 shown in partial section extending laterally from the impact plate in the direction towards which pebbles rebound, and a divider 4 separating the interior of the hopper 3 into compartments 5 and 6 which are, respectively, adjacent to and remote from the impact plate 2. Paths followed by pebbles in process are indicated by parabolic dash lines in FIGURE 1, only typical paths being indicated for simplification of the figure, for particles which are assumed to strike and rebound at the same place on plate 2, indicated by the legend IL abbreviated from the words "impact line" which is subsequently defined in this specification. The parabolic path followed by pebbles falling from the discharge lip of the feeder 1 to the impact line may be called the "drop parabola" and the tangent to this parabola at the point IL on FIGURE 1 is indicated by the legend T, departing from true vertical by the angle indicated by the Greek letter $\alpha$. The parabolic paths followed by rebounding pebbles may be called the "rebound parabolas" and the two such paths shown on FIGURE 1 are assumed to have a common tangent at the point IL, indicated by the legend Tr. The angle of inclination of the surface of the impact plate 2 with respect to the horizontal is designated on FIGURE 1 by the letter $a$. The tangent T, and Tr in FIGURE 1 both lie on the same side of a vertical plane through the impact line IL, due to the disposition of the feeder 2 above the hopper 3 such that the drop parabola overlies the rebound parabola, the pebbles reversing their horizontal direction on rebound, which arrangement I call "backward feed." However the feeder may, if desired, be disposed on the opposite side of the vertical plane through IL, and feeding in the opposite horizontal direction, which I call "forward feed"; and the subsequent discussion contemplates either arrangement. The top of the divider 4 in FIGURE 1 is shown located a horizontal distance A beyond the impact line IL and a vertical distance $d$ below the impact line. Pebbles rebounding through a longitudinal range less than A are collected in compartment 5 of hopper 3, and will be called the "discard portion," while pebbles rebounding through a longitudinal range greater than A are collected in compartment 6 and will be called the "product portion."

According to the present invention the aggregate feed is passed through such apparatus in the first stage, the divider 4 being adjusted to recover a product of the specified soft-stone content, in compartment 6, and the remainder discarded into compartment 5 is passed to the second stage in which the divider is set at a greater distance from the impact line, as will subsequently be explained in detail. By this means an additional amount of the specified product is recovered in the second stage. The discard from the second stage is then passed through a third stage in which the divider 4 is still further from the impact line, recovering more of the specified product; and the operation is thus repeated for as many more stages as desired, the distance "A" being successively greater in successive stages. By this means, the hard stone is progressively removed from the original aggregate in the form of a high quality product, while the amount of material discarded in each stage is progressively both reduced to such small amount and so enriched in soft stone content that the final residue may be discarded. It is not, of course, essential that all of the discard intercepted by divider 4 in any stage be passed on to the next successive stage, and my invention admits of recycling part of it within the same stage as disclosed and claimed in my co-pending application Ser. No. 530,331, filed August 24, 1955, on separating part of the discard as by screening out some of the fines and passing only the larger particles to the next stage as suggested in Stevens Patent 2,260,095 for example. My invention does require, however, that at least a portion of the discard from one compartment 5 is passed on to a succeeding stage of separation.

Before describing the operations in detail and explaining the setting of the dividers, I wish to specify certain conditions which I have discovered to be necessary to effect the maximum enrichment with respect to hard stones. I have found that manner of feeding provided by the feeder 1 is extremely important; that the height $h$ from the lip of the feeder should be held to narrow limits, from about 7'–6" to about 8'–0"; that impact plate should be inclined at a preferred angle $a$ about 22½° to the horizontal with correction for the angle $\alpha$; that the impact plate should be preferably rigid and massive, have a high modulus of elasticity and made of a hard, abrasion resistant alloy steel, and that the distance $d$ of the divider 4 below the impact line IL should be small, all as will be presently discussed in sufficient detail to enable a person skilled in the art to practice my invention.

I have discovered that there is a definite and determinable correlation between the setting of the divider 4 at various distances "A" from the impact line and the enrichment of the hard-stone content of the product with respect to that of the feed. Enrichment may be expressed in terms of what I call the "enrichment ratio," which I define as the ratio of the fraction of hard stone in the feed going into the product to the fraction of soft stone in the feed which also goes in the product in a given separation. The fractions may be expressed in any convenient terms, as a percentage of the total hard or soft stone or as a decimal fraction. Thus if H represents the hard stone in the feed, $mH$ represents the hard stone in the product, S represents the soft stone in the feed and $nS$ represents the soft stone in the product, the enrichment ratio is then the value of $m/n$. For example, if the feed consists of 90 parts of hard stone and 10 parts of soft stone, and the product is specified to contain 99 parts of hard stone and 1 part of soft stone, then it follows that $90m/10n=99/1$, or $m/n=990/90=11$, which is the "enrichment ratio" that must be had to effect the required beneficiation. The term "enrichment ratio" will also be represented in these specifications by the abbreviation E.R.

Figure 2:
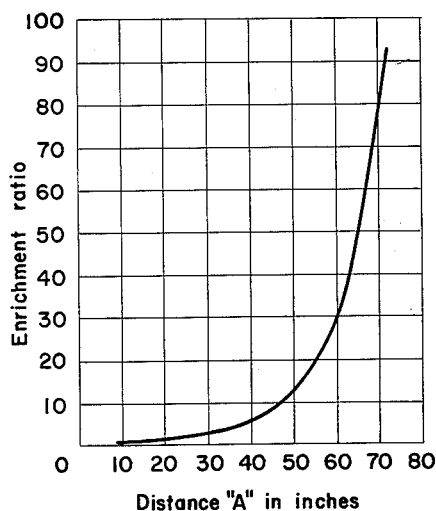
FIGURE 2 is a graph showing typical enrichment of the hard stone content of the product recovered in one stage as compared to that of the feed for the apparatus of FIGURE 1 at various adjusted settings.

The correlation between the distance "A" and the enrichment ratio is shown by the graph which is FIGURE 2. This curve is plotted from the results of extensive experiments I have made, the uniform conditions being that the drop height $h$ was 8 feet, the inclination of the impact plate $a$ is 22°50', and the distance $d$ was 13 inches. Backward feed was used with the particular type of feeding which I have found to give the best enrichment as shall subsequently be described. The distance "A" was varied in these experiments, and is indicated on the horizontal scale of FIGURE 2. From analysis of the distribution of hard and soft stone on each side of the divider 4, the enrichment ratio E.R. was found for different distances "A," this ratio being indicated on the vertical scale. It is seen that the values of E.R. increase relatively slowly as the distance "A" is increased for values of "A" below about 45 inches, and the E.R. increases very rapidly as "A" is increased beyond about 45 inches. Practically, commercial separations require enrichment in the region of the curve in which "A" is greater than 45 inches, and it is evident that the enrichment ratio is very sensitive to the divider setting, being significantly effected by changes of an inch or so or even of a fraction of an inch, or increments in the order of a small percentage of the distance "A." This is a new discovery of great importance and utility in this art and in the present system in particular.

When the divider 4 is set at 80" from the impact line in my experiments with the other conditions as previously specified, I find that no soft stones rebound into product compartment 6, which can thus be made entirely free of soft stones; however, only about 15% of the hard stones are recovered in the product, the remainder falling with the soft stones in discard compartment 5. Thus the enrichment ratio is infinite where "A" is 80"; and the curve of FIGURE 2, no matter how far extended, does not cross a vertical line erected at the 80" value for A. The 100% recovery of soft stone in compartment 5 at this setting is certain regardless of the number of such stones, but the 15% recovery of hard stone in compartment 6 is a statistical result which is consistent if the number of pebbles is very large, as in any commercial relation, but only expresses probability if the number of stones is few. Thus if two stones, one hard and one soft, were caused to rebound the soft stone is certain to fall in compartment 5 and there are 85 chances in 100 that the hard stone will also; but in rebounding tons of aggregates the recovery of 15% of the hard stones free of soft stones is assured.

While 15% recovery of pure hard stone per stage of separation is a remarkable achievement, a great many stages are required to substantially exhaust the aggregate feed of hard stones when a pure product is to be made. With 85% of the hard stone passing into the discard on each stage, mathematically the discard from the nth stage is $(.85)^n$. Hence the discard should contain 85% of the hard stone using a single stage system, 72% of the hard stone using a 2-stage system, 61% using a 3-stage system, 38% using a 6-stage system, and about 20% using a 10-stage system. However, I have discovered that stones become "fatigued" on repeated impact so as to react less favorably to separation by elastic rebound, and with 10 stages the discard will be found to contain substantially more than 20% of the hard stone due to this effect, the 15% recovery per stage applying to pebbles not so fatigued. Nevertheless, while it is not practically possible to recover all the hard stone in pure state by means of this process, it is readily feasible to obtain a substantial yield of such pure hard stone, as for example, about 62% using a six stage system.

However, if even small amounts of soft stone may be tolerated in the product, as permitted by present specifications, it becomes possible to recover practically all the hard stones from a typical natural gravel feed in the beneficial product, using only a few stages of treatment. In such case fatigue of the pebbles is an insignificant factor; also, the yield of hard stone per stage is much higher in every stage. The following two examples, where the product contains 0.5% soft stone and 1.0% soft stone, illustrate the recovery obtained by my invention.

Given a feed of washed glacial gravel ranging in particle size from ⅜" through 1" and containing 95% hard stone and 5% soft stone, the product to be made is a "bridge gravel" containing 99.5% hard and 0.5% soft stone. It is a distinct advantage to treat the material by my process while the material is wet. The soft stones and hard absorbent stones will take up water and lose elasticity. For this reason, I preferably take the stone to be treated directly from the washer or alternatively wet it before passing the stone to the feed. In this example there are six stages of separation each essentially as shown in FIG. 1 and described in connection therewith. The rate and composition of the feed, setting of the divider, enrichment ratio, and amount of bridge gravel product recovered in each stage is shown on Table I below, which also shows the amount and composition of the discard rejected at the sixth stage and the total product recovery from all six stages.

*Table I*

| Stage | Aggregate Feed | | | Divider Setting "A" | E.R. | Product, 0.5% Soft Stone, T./hr. |
|---|---|---|---|---|---|---|
| | Rate, T./hr. | Percent H | Percent S | | | |
| First | 100.0 | 95.0 | 5.0 | 48.6 | 10.50 | 46.8 |
| Second | 53.2 | 91.1 | 8.9 | 55.0 | 19.57 | 20.2 |
| Third | 33.0 | 85.7 | 14.3 | 61.0 | 32.69 | 9.7 |
| Fourth | 23.3 | 80.2 | 19.8 | 64.7 | 49.05 | 5.6 |
| Fifth | 17.7 | 73.9 | 26.1 | 68.3 | 69.60 | 3.4 |
| Sixth | 14.2 | 69.3 | 33.7 | 71.6 | 91.70 | 2.1 |

Reject: 12.2 T./hr., 63% H, 37% S. Total Product, 87.8.

In the above, T./hr. stands for tons per hour, percent H means percent hard stone, percent S means percent soft stone, and the divider setting A is given in inches.

As another example, I present in Table II below the "beneficiation of" the same glacial gravel feed of the previous example to produce coarse aggregate for concrete roads in which the soft stone is limited to 1%, i.e. containing 99% hard and 1% soft stone, in six stages of treatment as in the first example. The notation in Table II is the same as used in Table I.

*Table II*

| Stage | Aggregate Feed | | | Divider Setting "A" | E.R. | Product, 1% Soft Stone, T./hr. |
|---|---|---|---|---|---|---|
| | Rate, T./hr. | Percent H | Percent S | | | |
| First | 100.0 | 95.0 | 5.0 | 39.5 | 5.2 | 61.8 |
| Second | 38.2 | 88.8 | 11.2 | 51.0 | 12.9 | 18.1 |
| Third | 20.1 | 79.1 | 20.9 | 58.6 | 26.2 | 7.5 |
| Fourth | 12.5 | 67.0 | 33.0 | 64.5 | 47.5 | 2.6 |
| Fifth | 10.0 | 58.9 | 41.1 | 69.0 | 69.0 | 1.5 |
| Sixth | 8.5 | 51.8 | 48.2 | 71.8 | 92.5 | 0.9 |

Reject: 7.6 T./hr., 41.9% H, 58.1% S. Total Product, 92.4.

It is seen from the above examples that the flow progressively diminishes from stage to stage as the product is withdrawn. In the practice of my invention the length of the impact line and the corresponding width of the aggregate feeders is similarly decreased from stage to stage. This need not be in strict mathematical proportion to the flow rates actually obtained in the several stages for one particular operation, so as to require a different plant for a different operation, because I have found that the velocity of the pebbles delivered by the feeders may be varied over a wide range without impairing separation efficiency. Hence a plant may be constructed with a convenient decrease in the impact line length from stage to stage and adjustment made by suitable variation of the velocity of pebbles on the feeder to accommodate the various separation operations contemplated.

While the foregoing examples described a process in which the feed ranged between ⅜" and 1" this is by way of illustration only. One of the advantages of my invention is that it is applicable to the treatment of mixed aggregate of a great range of particle size, as from ⅜" to 3" or larger, as it may come from the gravel washing plant.

The enrichment ratio increases from stage to stage as shown in Tables I and II, the only apparent exception being where the product is pure hard stone and the enrichment ration is infinite in all stages. The percent of hard stone in the product decreases as the enrichment ratio increases, being at a minimum of about 15% where E.R. is infinite as I have already explained, and obviously increasing to 100% at the other extreme where E.R. is zero, the divider then coinciding with the impact line and all the aggregates being collected in compartment 6. It is highly important not only to be able to obtain high enrichment ratios, but also to effect the maximum recovery of hard stone in the product at such enrichment ratios, as the advantage of stage-wise processing is greatly diminished unless this unfavorable drop in yield per stage is alleviated by controlling the operation so as to recover the greatest possible yield of hard stone in the successive stages.

Figure 3:
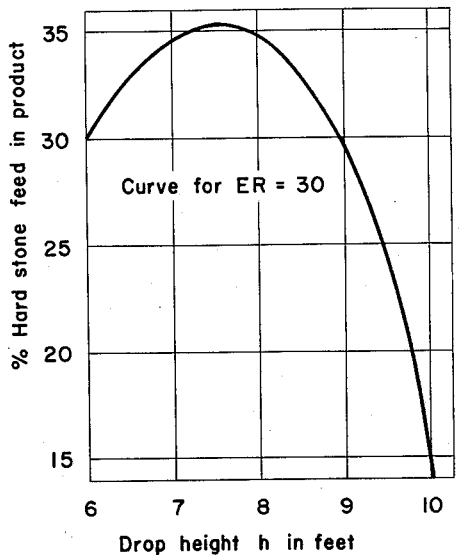
FIGURE 3 is a curve showing the effect of kinetic energy before impact on the efficiency of separation of hard and soft stones by elastic rebound.

I have discovered that one of the most important factors to be controlled in this connection is the drop height $h$, and that this should be fixed at about 7½ to 8 feet in all stages of the system. The effect of variation in drop height $h$ may be read from the graph of FIG. 3 which was plotted from the results of my experimental data, in which the height $h$ was varied from 6 through 10 feet. FIG. 3 shows the variation of the percent of hard stone contained in the feed which is found to be recovered in product compartment 6 when the divider is set to give an enrichment ratio of 30, the other variable being the drop height $h$, all other conditions such as the impact plate angle $a$, the distance $d$, manner of feed, and size and character of the gravel being held constant and the same as obtained in the foregoing examples and in the experiments from which FIG. 2 was also derived. FIG. 3 is typical of the effect of changing the drop height $h$ on the amount of hard-stone recovered in the product at all enrichment ratios, and no significance is to be attached to the selection of the ratio 30 for purpose of example except that an E.R. of this order is to be expected in some stage in almost any conceivable practical operation, as is evident from Tables I and II. As shown by FIG. 3, the amount of hard stone recovered in the product decreases rapidly as the height $h$ departs from the range of about 7½ to 8 feet.

Referring now to FIGS. 4 through 8 inclusive, I will proceed to describe a suitable apparatus structure according to my invention, the figures showing one embodiment of such apparatus. The plant illustrated as a 3-stage unit. If six stages are desired, two such units may be provided in series or one unit only may be used, storing the rejects at the end of the third stage and later re-running them through the plant to obtain three more stages of operation.

Figure 5:
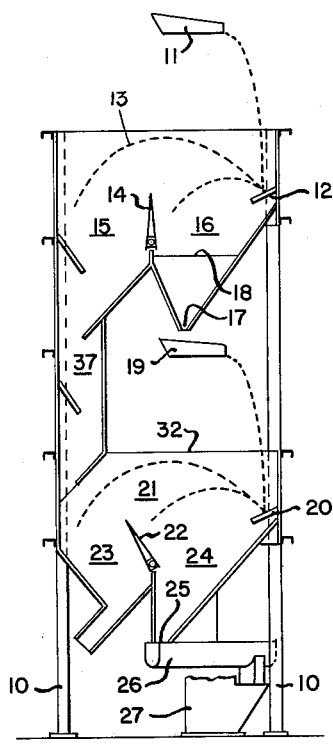

The plant consists of a structure carried by four columns 10 above which is surmounted a first stage electrically vibrated pan type feeder 11, the supports of which are omitted from the figures for simplification. The feeder 11 pours pebbles through defined drop parabolas having a drop height of about 8 feet, upon a first-stage impact plate 12 extending generally between one pair of the columns 10, the arrangement shown being for backward feed. Impact plate 12 is laterally adjacent one wall of the first-stage hopper bin 13, and inclined at about 22°–50' to the horizontal so as to cause pebbles to rebound towards the opposite wall. Between the impact plate and the opposite wall is provided an adjustable divider 14 extending transversely across the bin 13, and dividing it into compartments 15 and 16 which are, respectively, the product and discard compartments. The divider may be adjustable through a distance suitable for the range in enrichment ratio desired for the operations contemplated, as by being pivoted at its base as shown in FIG. 5. The bottom of hopper 16 is in the form of a funnel having a discharge slot 17 extending transversely of the structure but only part way across, and is provided with distributing baffles 18 which cause a fairly uniform distribution of the pebbles discharged lengthwise of the slot 17.

Hopper 16 empties into the second-stage electrically vibrated pan feeder 19 which is adjacent one side of the structure, and is much narrower than feeder 11, and pours the reject aggregates from the first stage through defined drop parabola upon the second-stage impact plate 20, disposed in a bin 21 which is narrower than bin 13 above, and is similarly divided by adjustable divider 22 into product compartment 23 and reject compartment 24. Compartment 24 has a bottom discharge opening 25 which is transversely askew of the hopper and empties into a conveyor 26, indicated as a screw conveyor on FIG. 8 in particular, crossing under the structure and discharging into the feed boot of an elevator 27 erected on the opposite side of the plant, which supplies the rejects from the second stage to the third stage of the system.

Elevator 27 empties through a spout 27a on the pan of a vibratory feeder 28 which extends between a pair of columns 10 back into the structure, just above the third stage feeder 29, which is parallel and adjacent to the second stage feeder 19, and is at the same elevation in the structure, but which is preferably narrower in width. Feeder 28 has a relatively narrow pan and passes diagonally above feeder 29, discharging thereto through a diagonal slot 28a in the pan which is about the same length as the width of feeder 29 and distributes the aggregates uniformly across the feeder 29. The aggregates flow over the lip of feeder 29 in drop parabolas on to an inclined impact plate 30, so as to rebound into the third stage bin 31. The impact plates 20 and 30 are substantially in linear alignment and extend in series between columns 10 on the same side of the structure some distance below the first-stage impact plate 12. Indeed, impact plates 20 and 30 may be different sections along the same continuous slab of steel identical with plate 12 if desired. The bins 21 and 31, however, are separated from one another by a partition 32. Bin 31 is fitted with an adjustable divider 33 into product compartment 34 and discard compartment 35. Final discard is removed at the opening 36 in compartment 35.

Figure 6:
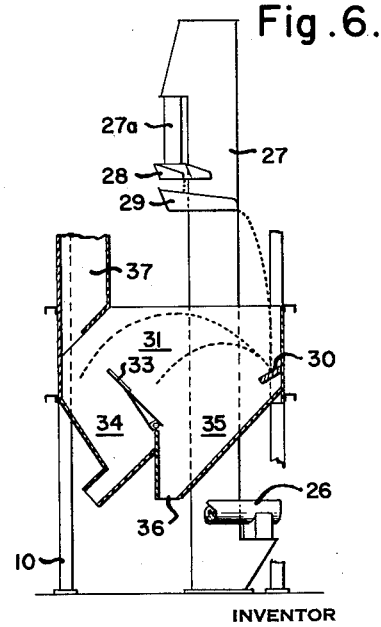
FIGURES 5 and 6 are sections in elevation taken respectively at the planes V—V and VI—VI on FIGURE 4, and FIGURES 7 and 8 are sections in plan taken respectively at the planes VII—VII and VIII—VIII on FIGURE 4.

As shown in FIGS. 5 and 6, the product from the first stage passes from compartment 15 downward through a baffled chute whence it emerges to mingle with the second and third stage product portions in compartments 23 and 34, from which the combined product is withdrawn.

Figure 4:
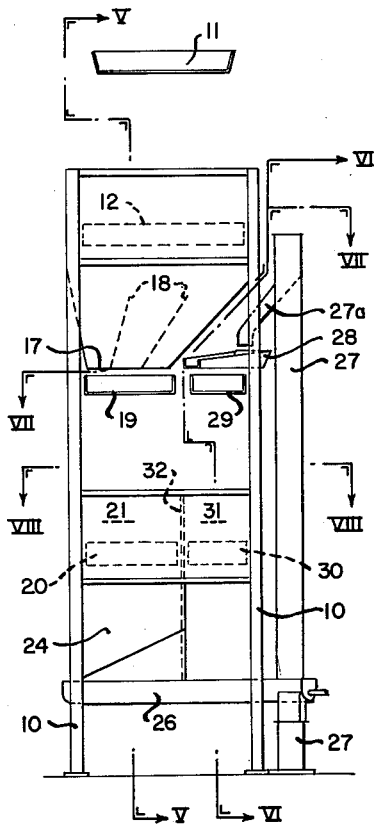
FIGURE 4 is an elevation showing an apparatus for continuously running a raw feed and successively re-running the discard according to my invention.
Figure 7:
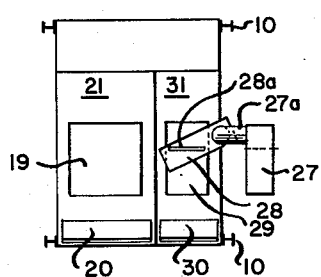

The arrangement for loading the first stage feeder 11 may be substantially the same as that shown in FIGS. 4, 6, and 7 for loading the third stage feeder 29, namely, an elevator would be provided, preferably on the opposite side of the structure from elevator 27, raising aggregates from supply at ground level to the top of the plant and discharging them through a spout into the pan of an obliquely-extending electrically vibrated feeder, similar to feeder 28, provided above the feeder 11. This oblique feeder above feeder 11 also has a diagonal slot similar to slot 28a, of substantially the same width as the feeder 11, the aggregates being distributed uniformly across feeder 11 in a mono-layer by discharge through such slot in the same manner as it is distributed across feeder 29 shown particularly in FIG. 7.

I have discovered that it is important for obtaining most favorable distribution of hard and soft stones between the product and discard, that the pebbles progress in a mono-layer over the feeders 1, 11, 19 and 29 in the drawings, so as to individually topple over the discharge edge of the feeders and fall freely in defined drop parabolas towards the impact plate, as described and explained in greater detail in my co-pending application Ser. No. 530,331. This condition was obtained in the experiments from which FIGS. 2 and 3 represent the results, and applies to the beneficiations set forth in all the examples herein.

Figure 8:
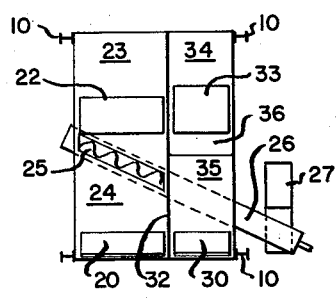

It is readily apparent how the apparatus shown in FIGS. 4 through 8 would be used in effecting the beneficiations of the examples set forth in Tables I and II. Assuming that the vibratory feeders are proportioned to impart the same velocity to the aggregates in stages 1, 2 and 3 at the rates specified in Table I, feeder 19 would be about 53% of the width of feeder 12 and feeder 29 would be about 33% of the width of feeder 12, both together totalling about 86% of the width of the first stage feeder; such that they can readily be placed side by side in a horizontal area no greater than that required for feeder 12 as shown in FIG. 4. When this unit is applied to a relatively easier separation such as set forth in Table II, the flow over the second and third stage feeders is substantially less than the design flow and can readily be obtained by simply reducing the rate of flow over feeders 19 and 29. Similarly there is ample width between the columns under the first stage impact plate 12 for arranging the second-stage impact plate 20 and third-stage impact plate 30 end-to-end as shown in FIGS. 4, 7 and 8.

A unit desired particularly for effecting the last three stages need be roughly only one third as wide as the unit for the first three stages. The feeders 19 and 29 for the fifth and sixth stages respectively may be selected based on Table I, at say 20 and 15 tons nominal capacity, which would determine the overall width of the plant, and the feeder 12 for the first stage need have a width of about 25 tons/hr. nominal capacity. However, it may be preferable for economical use of equipment to store the rejects from stage 3 until a sufficient amount has accumulated for running them at the 100 ton/hr. rate through the larger plant, used for stages 1 through 3. This can be done in about one-fourth of the time required to run the same rejects continuously in a smaller unit as discharged from the larger unit. For a large beneficiation operation, where several units may be used anyway, they may be conveniently built all alike and one such unit provided to run the last three stages while a plurality of other units are running the first three stages of a beneficiation operation such as Table I or Table II.

While I have illustrated and described certain preferred embodiments of my invention and certain preferred practices it is to be understood that the details of the apparatus and manipulative steps adopted in the practice of my invention may be such as those skilled in the art choose to employ, the examples specifically set out herein being merely illustrative of my invention, which is set forth in the following claims.

I claim:

1. A method of recovering a hard stone enriched component from natural aggregate containing hard stones and soft stones, comprising the steps of adding moisture to the aggregate in an amount sufficient to cause absorption by porous stones in the aggregate, maintaining the stones in contact with the moisture until a substantial amount of moisture is absorbed in the porous stones, feeding the aggregate as a substantially mono-layer into space, accelerating the aggregates by free fall in unrestrained parabolas, impinging the aggregates on a hard elastic surface inclined to the horizontal, intercepting in flight a portion of the aggregate rebounding from said inclined surface intermediate the extremes of the rebound range, collecting as the enriched product all aggregates rebounding beyond said intercepted portion, subjecting at least a part of the portion intercepted to further free fall and rebound, intercepting the thus rebounded aggregate in flight at an adjusted distance such that a portion rebounding beyond the point of interception has substantially the composition of the enriched product and continuing in this fashion until the major portion of hard stones has been separated from the soft stones as an enriched product.

2. A method of recovering a hard stone enriched component from natural aggregate containing hard stones and soft stones, comprising the steps of adding moisture to the aggregate in an amount sufficient to cause absorption by porous stones in the aggregate, maintaining the stones in contact with the moisture until a substantial amount of moisture is absorbed in the porous stone, feeding the aggregate as a substantially mono-layer into space, accelerating the aggregates by free fall in unrestrained parabolas until they have acquired a kinetic energy of about 7.5 to 8 foot pounds per pound of aggregate, impinging the aggregates on a hard elastic surface inclined to the horizontal, intercepting in flight at least one portion of the aggregate rebounding from said inclined surface intermediate the extremes of the rebound range, collecting as the enriched product all aggregates rebounding beyond said intercepted portion, subjecting at least a portion of the intercepted aggregate to further free fall and rebound, intercepting the thus rebounded aggregate in flight at an adjusted distance such that a portion rebounding beyond the point of interception has substantially the composition of the enriched product, and continuing in this fashion until the major portion of hard stones has been separated from the soft stones as an enriched product.

3. A method of recovering a hard stone enriched component from natural aggregate containing hard stones and soft stones, comprising the steps of adding moisture to the aggregate in an amount sufficient to cause absorption by porous stones in the aggregate, maintaining the stones in contact with the moisture until a substantial amount of moisture is absorbed in the porous stone, feeding the aggregate as a substantially mono-layer into space, accelerating the aggregates by free fall in unrestrained parabolas until they have acquired a kinetic energy of about 7.5 to 8 foot pounds per pound of aggregate, impinging the aggregates on a hard elastic surface inclined to the horizontal, at an angle equal to 22.5° plus the angle of divergence from the vertical of the tangent to the drop parabolas at the point of impact with the surface, the angle of divergence having a positive value when the divergence from the vertical is in the direction of rebound and a negative value when the divergence from the vertical is away from the direction of rebound, intercepting in flight a portion of the aggregate rebounding from said inclined surface intermediate the extremes of the rebound range, collecting as the enriched product all aggregates rebounding beyond said intercepted portion, subjecting at least a part of the portion intercepted to further free fall and rebound, intercepting the thus rebounded aggregate in flight at an adjusted distance such that a portion rebounding beyond the point of interception has substantially the composition of the enriched product and continuing in this fashion until the major portion of hard stones has been separated from the soft stones as an enriched product.

4. A method of recovering the hard stone component of natural mineral aggregate by successive stages of elastic rebound in series, the improvement comprising adding moisture to the aggregate in an amount sufficient to cause absorption by porous stones in the aggregate, maintaining the stones in contact with the moisture until a substantial amount of moisture is absorbed in the porous stone, accelerating the aggregates in each stage by free fall in defined drop parabolas until they have acquired a kinetic energy of about 8 ft. lbs. per pound of aggregates, impinging the aggregates of said kinetic energy in each state upon a hard, elastic surface inclined to the horizontal, intercepting in flight a portion of the aggregates rebounding from said inclined surface at a predetermined range of flight from said surface, collecting as the product all aggregates rebounding beyond said predetermined ranges and passing at least a portion of the intercepted aggregates from each stage except the last to the next successive stage, the said predetermined range in the first stage being a distance effecting a definite enrichment ratio of a product of specified soft stone tolerance to the natural aggregate feed and said predetermined range in each successive stage being fixed at respective distances increasing the enrichment ratio in correspondence with the changed composition of the portion intercepted and passed from the next previous stage to maintain the same soft stone tolerance in the product from all stages.

References Cited in the file of this patent

UNITED STATES PATENTS

| 2,260,095 | Stevens | Oct. 21, 1941 |
| 2,607,482 | Weisz | Aug. 19, 1952 |
| 2,666,524 | Payne | Jan. 19, 1954 |

FOREIGN PATENTS

| 656,038 | France | Dec. 24, 1928 |